Oct. 6, 1959 E. G. CLARK 2,907,898
TRANSISTOR SHIFT REGISTER
Filed Feb. 27, 1957
2 Sheets-Sheet 1
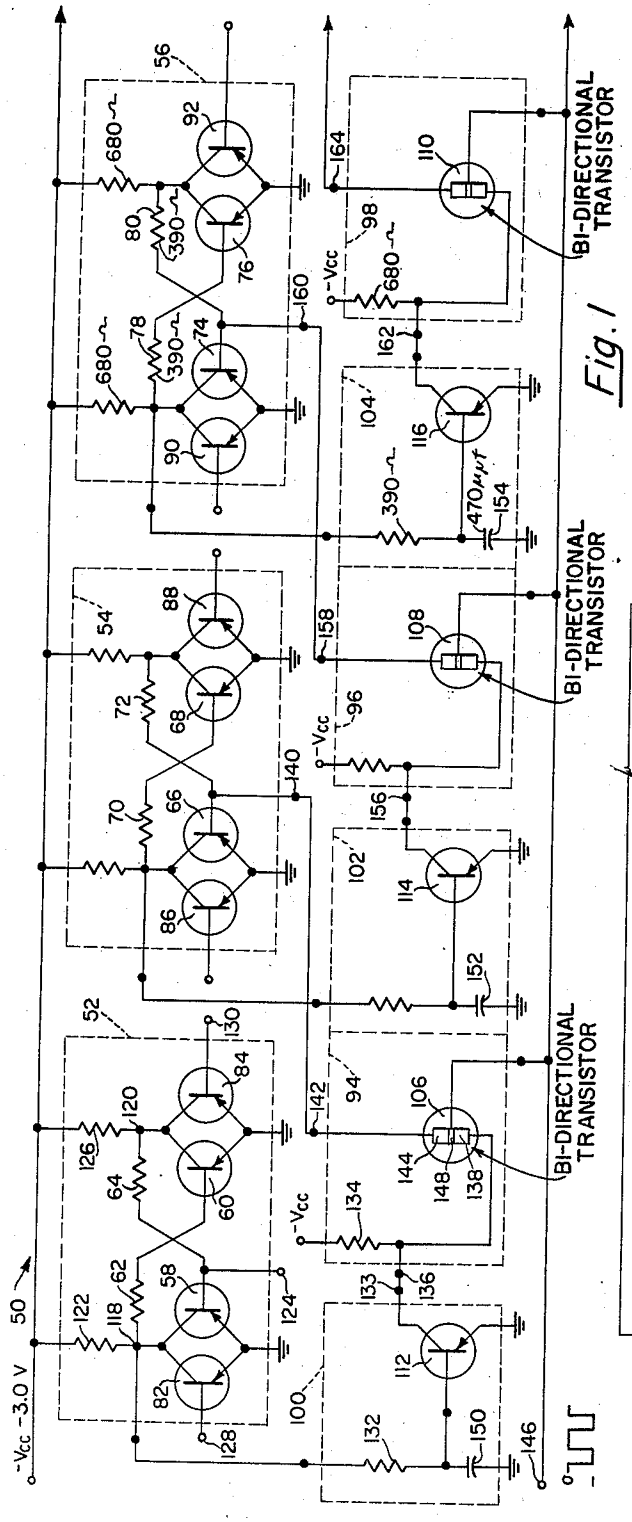
Fig. 1
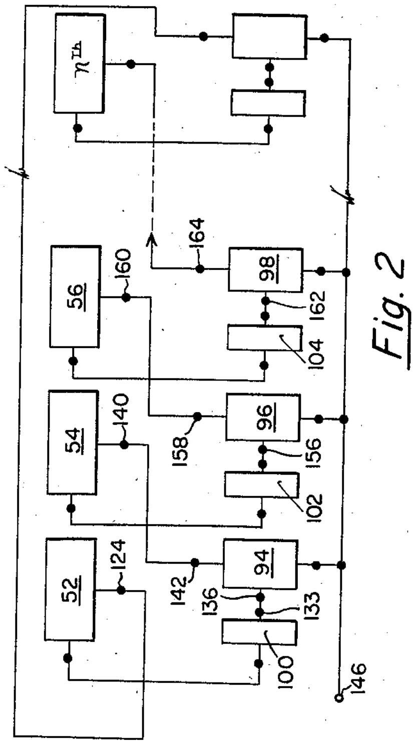
Fig. 2
| | 52 | 54 | 56 |
|---|---|---|---|
| 1 | 0 | 0 | 1 |
| 2 | 0 | 1 | 0 |
| 3 | 1 | 0 | 1 |
| 4 | 1 | 1 | 0 |
Fig. 3
| | 52 | 54 | 56 |
|---|---|---|---|
| 1 | 0 | 0 | 0 |
| 2 | 0 | 0 | 1 |
| 3 | 1 | 1 | 0 |
| 4 | 1 | 1 | 1 |
Fig. 4
INVENTOR.
EDWARD GARY CLARK
BY Edward W. Hughes
ATTORNEY

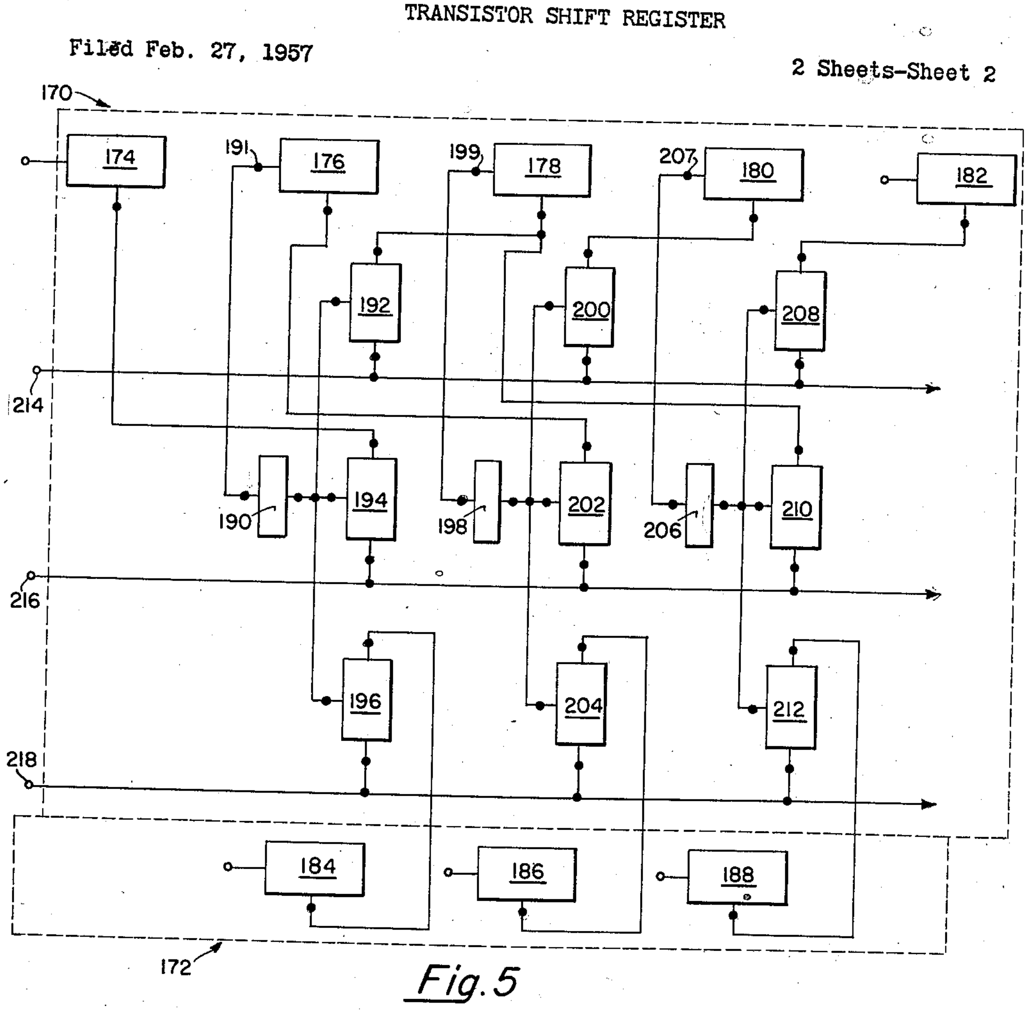
Fig. 5
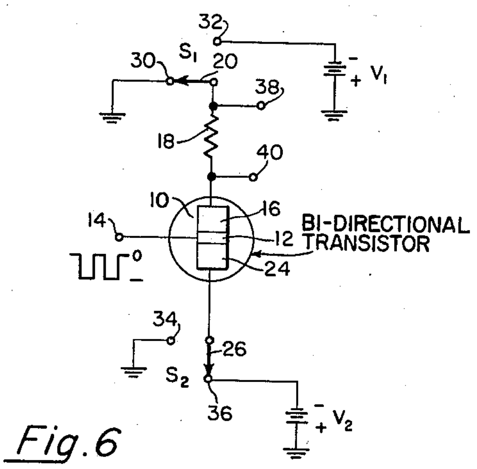
Fig. 6
| | $S_1$ | $S_2$ | $V_0$ |
|---|---|---|---|
| 1 | 0 | 0 | 0 |
| 2 | 1 | 0 | -1 |
| 3 | 0 | 1 | +1 |
| 4 | 1 | 1 | 0 |
Fig. 7
INVENTOR.
EDWARD GARY CLARK
BY
Edward W. Hughes
ATTORNEY United States Patent Office 2,907,898

Patented Oct. 6, 1959

2,907,898

TRANSISTOR SHIFT REGISTER

Edward Gary Clark, Oreland, Pa., assignor to Burroughs Corporation, Detroit, Mich., a corporation of Michigan Application February 27, 1957, Serial No. 642,767

14 Claims. (Cl. 307—88.5)

This invention relates to means for causing one bistable device to assume a stable state corresponding to the stable state of another bistable device, and more particularly to shift registers.

A bistable device may be defined as a device having two stable states and either two input terminals to which are applied input signals of the same type or a single input terminal to which is applied two types of input signals. The stable states of the bistable device will correspond to either the terminal to which the last input signal is applied or the last type of input signal applied. A bistable device will remain in either state until caused to change to the other state by the application of the corresponding signal.

In data processing machines the state of a bistable device may be used to represent binary data. It is frequently desirable to transfer this data to a second bistable device in response to a control signal by causing the second device to assume a stable state corresponding to that of the first. A shift register is an extension of this concept to a number of bistable devices for the purpose of storing and manipulating binary data. Upon the application of a control signal such as a shift pulse to such a register, the data or information represented by the stable state of each bistable device in the register may be shifted or transferred to another bistable device in the same register. Displacing the binary information stored in a register one place to the left is the equivalent of multiplying the information by radix 2, and displacing the information stored in a register one place to the right is the equivalent of dividing the stored information by the radix 2.

The shift register described and claimed herein uses gates which rely on certain unique characteristics of junction transistors. A junction transistor consists of a semiconductive body, for example of germanium or silicon, having an intermediate zone of one conductivity type, N or P, between and contiguous with two outer zones of the opposite conductivity type. Emitter and collector connections are made respectively to the outer zones, and a third connection, the base connection, is made to the intermediate zone. Between the two outer zones and the intermediate zone, or the base, there are defined two junctions, normally referred to as the emitter junction and the collector junction. The collector junction is normally biased in the reverse, or high resistance, direction, and the emitter junction is normally biased in the forward, or low resistance, direction. With the exception in certain types of transistors of the areas of the junctions between the outer zones and the intermediate zone, there is, in general, no physical or electrical characteristic which will identify one outer zone as an emitter and the other outer zone as a collector. There is a functional difference between an outer zone acting as an emitter and an outer zone acting as a collector. However, whether a given outer zone acts as an emitter or as a collector is determined solely by the bias across its junction with the intermediate zone.

The interchangeability of the emitter and collector of the transistor, which is also referred to as the bidirectional characteristic of the transistor or as the single-unit symmetry of a transistor, is well known in the art; see: Proceedings of the IRE, June, 1953, pages 720–721. The gates of the shift register constituting this invention use the bidirectional characteristics of transistors. Each gate is so interconnected directly between the transferor and transferee flip-flops as to provide the proper input signal to the transferee flip-flop to cause it to change to a stable state corresponding to the state of the transferor flip-flop when a shift pulse is applied to the gate. Since each gate can produce the two types of signals necessary to place the transferee flip-flop in either of its two stable states, only a single gate is needed for each transferee flip-flop.

It is, therefore, an object of this invention to provide improved means for causing one bistable device to assume a stable state corresponding to the stable state of another bistable device.

It is a further object of this invention to provide a shift register having improved performance characteristics and in which the number of components required is minimized.

It is another object of this invention to provide a shift register which has steering gates which use the bidirectional characteristics of transistors.

It is still another object of this invention to provide a high speed register in which only a single bidirectional gate is needed to cause a transferee flip-flop to assume the same stable state as the transferor flip-flop.

It is a still further object of this invention to provide a shift register having gates which may be directly connected between the transferor and transferee bistable devices.

It is still another object of this invention to provide a shift register in which the input and output voltage ranges of the gates interconnecting the bistable devices of the register are substantially the same as the input and output voltage ranges of the bistable devices they interconnect.

It is still a further object of this invention to provide a shift register having gates which have current-gain characteristics.

Other objects and many of the attendant advantages of this invention will be readily appreciated as the same become better understood by reference to the following detailed description when considered in connection with the accompanying drawing.

Fig. 1 is a schematic diagram of a portion of a shift register;

Fig. 2 is a block diagram of the shift register of $n$ stages;

Fig. 3 and Fig. 4 are charts illustrating the operation of the device illustrated in Fig. 1;

Fig. 5 is a block diagram illustrating how several gates can be treed off a single buffer circuit;

Fig. 6 is a schematic diagram illustrating the operation of a directional gate; and Fig. 7 is a chart describing the operation of the circuit of Fig. 6.

Before describing the operation of the shift register illustrated, the principles of the operation of a bidirectional gate will be explained in conjunction with Figs. 6 and 7. In Fig. 6 there is illustrated a bidirectional transistor 10 of the pnp type whose intermediate zone, or base, 12 is connected to terminal 14. Outer zone 16 of bidirectional transistor 10 is connected through resistor 18 to movable arm 20 of a single-pole double-throw switch $S_1$. The other outer zone 24 is connected to movable arm 26 of the single-pole double-throw switch $S_2$. Terminal 30 of switch $S_1$ is connected to a point at reference potential, or is grounded, and terminal 32 of switch $S_1$ is connected to a suitable source of potential $V_1$, illustrated schematically as a battery. Terminal 34 of switch $S_2$ is grounded, and terminal 36 of switch $S_2$ is connected to a suitable source of potential $V_2$, which is illustrated schematically as a battery. Negative going input pulses are adapted to be applied to terminal 14; the magnitude of these pulses is, however, normally less than either $V_1$ or $V_2$. If arm 20 of switch $S_1$ is positioned so that it contacts terminal 30 and if arm 26 of switch $S_2$ is positioned to contact terminal 34, then outer zones 16, 24 of bidirectional transistor 10 are both connected to ground. No transistor action takes place and substantially no current will flow through resistor 18 when a negative pulse is applied to input terminal 14, since both junctions of bidirectional transistor 10 are forward biased while the input pulse is applied. Thus there will be substantially no voltage drop across resistor 18, and the voltage between terminals 38 and 40 will be substantially zero.

If movable arm 20 of switch $S_1$ is connected to terminal 32 and if movable arm 26 of switch $S_2$ is connected to terminal 34, then zone 16 is connected to source $V_1$ and zone 24 is grounded. The junction between zone 16 and base 12 is reverse biased, and the junction between zone 24 and base 12 is forward biased when a negative pulse is applied to terminal 14, so that transistor action takes place and conventional current will flow through load resistor 18 in such a direction as to make terminal 40 positive with respect to terminal 38. The action of the circuit under the above circumstances is analogous to that of a common emitter.

If arm 20 of switch $S_1$ is connected to terminal 30 and if arm 26 of switch $S_2$ is connected to terminal 36, then the junction between zone 24 and base 12 will be reverse biased and the junction between zone 16 and base 12 will be forward biased when a negative pulse is applied to terminal 14. The application of such a negative pulse under these conditions causes transistor action, and current flows through resistor 18 in such a direction as to cause terminal 40 to be negative with respect to terminal 38. This action of the circuit under these circumstances is analogous to that of an emitter follower.

If arm 20 of switch $S_1$ is connected to terminal 32 and if arm 26 of switch $S_2$ is connected to terminal 36, then zones 16 and 24 are connected to $V_1$ and $V_2$, respectively. When a negative pulse is applied to terminal 14, both junctions of bidirectional transistor 10 have reverse biases applied thereto; no transistor action takes place and substantially no current can flow through resistor 18. The voltage between terminals 40, and 38 is substantially zero.

The operation of the circuit of Fig. 6 is described by the chart of Fig. 7. When arm 20 of switch $S_1$ is positioned so that zone 16 of transistor 10 is connected to ground and when arm 26 of switch $S_2$ is positioned so that zone 24 of transistor 10 is also connected to ground, then substantially no current will flow through resistor 18, and a substantially zero output voltage is developed across resistor 18 when an input signal is applied to input terminal 14. If ground potential and zero potential are denoted 0, then the operation of the circuit is described by line 1 of Fig. 7.

When arm 20 of switch $S_1$ is positioned so that $V_1$ is connected through resistor 18 to zone 16 and arm 26 of switch $S_2$ is positioned so that zone 24 is connected to ground, then the applications of a negative pulse to terminal 14 will produce an output voltage across resistor 18. The voltage $V_1$ may be denoted 1, and the output voltage between terminals 38, 40 may be denoted −1. Line 2 of Fig. 7 describes the operation of the circuit of Fig. 6 under these circumstances.

When arm 20 of switch $S_1$ is positioned so that zone 16 is connected to ground through resistor 18 and arm 26 of switch $S_2$ is connected so that zone 24 is connected to $V_2$, then current will flow through resistor 18 in the opposite direction to that previously described when a negative pulse is applied at terminal 14. Voltage $V_2$ may be denoted 1, and the output voltage between terminals 38, 40 may be denoted +1. The operation of the circuit of Fig. 6 under these circumstances is described in line 3 of Fig. 7.

When arm 20 of switch $S_1$ is positioned so that zone 16 is connected through resistor 18 to $V_1$ and arm 26 of switch $S_2$ is positioned so that zone 24 is connected to $V_2$, then substantially no current will flow through resistor 18 when the input signal is applied at terminal 14. The voltage across resistor 18 will be substantially zero and may be denoted 0. The operation of the circuit of Fig. 6 under these circumstances is described in line 4 of Fig. 7. It should be noted that the "1's" and "0's" as used in Fig. 7 do not necessarily represent voltages of equal magnitudes, but only ranges of voltages, with 0 representing a range of from 0 to −0.1 v. and 1 representing a range of from substantially −0.3 v. to −*Vcc* in a preferred example.

In Fig. 1 a portion of shift register 50 is illustrated; included in this portion are bistable devices 52, 54, 56. Bistable device 52 consists of transistors 58, 60, which are cross coupled by base resistors 62, 64 to form a flip-flop; bistable device 54 consists of transistors 66, 68, which are cross coupled by base resistors 70, 72 to form a second flip-flop; and bistable device 56 consists of transistors 74, 76, which are cross coupled by base resistors 78, 80 to form a third flip-flop. Each of bistable devices 52, 54, 56 is provided with means for setting it to one of its stable states and for resetting it to its other stable state. Bisable device 52 is provided with set transistor 82, which is connected in parallel with transistor 58, and with reset transistor 84, which is conected in parallel with transistor 60; bistable device 54 is provided with set transistor 86, which is connected in parallel with transistor 66, and with reset transistor 88, which is connected in parallel with transistor 68; and bistable device 56 is provided with set transistor 90, which is connected in parallel with transistor 74, and with reset transistor 92, which is connected in parallel with transistor 76.

In Fig. 1 each of bistable devices 52, 54, 56 has associated with it a bidirectional gate. Bistable device 52 is associated with gate 94; bistable device 54 is associated with gate 96; and bistable device 56 is associated with gate 98. Buffer circuit 100 interconnects bistable device 52 and gate 94; buffer circuit 102 interconnects bistable device 54 and gate 96; and buffer circuit 104 interconnects bistable device 56 and gate 98. Gates 94, 96, 98 include bidirectional transistors 106, 108, 110, respectively. Buffer circuits 100, 102, 104 include transistors 112, 114, 116, respectively.

It is possible to design circuits using pnp junction transistors of the alloy, grown, or surface barrier types in the common emitter configuration, so that the transistors of such circuits will saturate, or bottom, if the potentials of their bases with respect to their emitters, which are generally at ground potential, are within a voltage range of from −0.3 v. to −*Vcc*, which range of voltages will hereafter be denoted as the 1 voltage range, and so that the transistors will be substantially biased off if the potentials of their bases with respect to their emitters are within a voltage range of from −0.1 v. to ground, which will hereafter be denoted as the 0 voltage range. These voltage ranges obviously may vary depending upon the characteristics of the transistors used, as is well known in the art. In such circuits the potential of the collector of a bottomed transistor will be within the 0 voltage range, and the collector of a cut off transistor will be in the 1 voltage range. When the collector of a first transistor is connected to the base of a second transistor in a similar configuration, the second transistor will be cut off when the first transistor is bottomed, and the second transistor will be bottomed when the first transistor is cut off. The devices described and illustrated as examples of embodiments of the invention use transistor circuits having substantially such characteristics.

In order to simplify the explanation of the operation of the shift register, the operation of a single bistable device, flip-flop 52, and the operation of its associated buffer circuit 100, and bidirectional gate 104 will be made in greater detail. The operation of flip-flops 54, 56 will be substantially the same as that of flip-flop 52, and that of their associated buffer circuits and bidirectional gates will be substantially the same as that of buffer circuit 100 and bidirectional gate 94.

If it is assumed initially that transistor 58 is cut off, then the potential of terminal 118, which is connected to the collector of transistor 58, will be within the 1 voltage range. This potential, which is applied to the base of transistor 60 through base resistor 62, will be sufficient to cause transistor 60 to become saturated, or bottomed, so that the potential of terminal 120, which is connected to the collector of transistor 60, will be within the 0 voltage range. The potential of terminal 120 is coupled through base resistor 64 to the base of transistor 58. The actual voltage of terminal 118 of transistor 58 is determined by the magnitude of the collector supply source *Vcc*, which source is not illustrated, and the voltage drop across load resistor 122 due to the base current drawn by transistor 60 and transistor 112 of buffer circuit 100.

If a negative pulse of sufficient amplitude and duration is applied to input terminal 124 of flip-flop 52, the potential of the base of transistor 58 will be within the 1 voltage range, which causes transistor 58 to conduct. When transistor 58 conducts, the potential of terminal 118 increases so that it is within the 0 voltage range, which cuts off transistor 60 and causes the potential of terminal 120 to be within the 1 voltage range, which potential in turn maintains transistor 58 bottomed. The exact voltage of terminal 120 is determined by the magnitude of *Vcc* and the voltage drop across load resistor 126 due to the base current drawn by bottomed transistor 58.

If a positive pulse of sufficient amplitude and duration is applied to input terminal 124, it will raise the voltage of the base of transistor 58 so that it is within the 0 voltage range, which cuts off transistor 58. When transistor 58 cuts off, the potential of terminal 118 changes so that it is within the 1 voltage range, which potential is applied to the base of transistor 60 through base resistor 62, which causes transistor 60 to bottom, raising the potential of collector 120 so that it is within the 0 voltage range, which maintains transistor 58 cut off.

The application of a negative pulse of sufficient amplitude and duration to set terminal 128 will bottom transistor 82. This raises the potential of terminal 118 so that it is within the 0 voltage range, which in turn causes transistor 60 to cut off. Bistable device 52 will then assume a stable state in which the potential of collector 118 is within the 0 voltage range. The application of a negative pulse to reset terminal 130 from a source which is not illustrated will cause reset transistor 84 to bottom, which in turn will raise the potential of terminal 120 so that it is within the 0 voltage range. This will cut off transistor 58, with the result that the potential of terminal 118 will be within the 1 voltage range. By definition, whenever the potential of terminal 118 of flip-flop 52 is within the 1 voltage range, flip-flop 52 will be denoted as being in the 1 state and when the potential of terminal 118 is within the 0 voltage range, flip-flop 52 will be denoted as being in the 0 state; this convention will be used to describe the states of the other flip-flops illustrated. It should be understood that means other than reset and set transistors may be used to place a flip-flop in a predetermined stable state.

When flip-flop 52 is in its 0 state, terminal 118 is within the 0 voltage range; and since terminal 118 is connected by base resistor 132 to the base of transistor 112 of buffer circuit 100, transistor 112 will be cut off. The potential of output terminal 133 of buffer circuit 100, which is connected to the collector of transistor 112, will be within the 1 voltage range since it is connected to a source of collector potential *Vcc* through load resistor 134. When flip-flop 52 is in its 1 state, terminal 118 will be within the 1 voltage range. Since terminal 118 is connected to the base of transistor 112 through resistor 132, transistor 112 will bottom, with the result that output terminal 133 will be within the 0 voltage range.

Output terminal 133 of buffer circuit 100 is directly connected to input terminal 136 of gate 94, which in turn is directly connected to outer zone 138 of bidirectional transistor 106 of gate 94, so that when flip-flop 52 is in its 1 state, outer zone 138 of bidirectional transistor 106 will be connected to a terminal within the 0 voltage range. When flip-flop 52 is in its 0 state, outer zone 138 of bidirectional transistor 106 will be connected to a terminal within the 1 voltage range.

When flip-flop 54 is in its 0 state, its input terminal 140 will be within the 1 voltage range and when flip-flop 54 is in its 1 state, the potential of input terminal 140 will be within the 0 voltage range. Input terminal 140 of flip-flop 54 is directly connected to output terminal 142 of gate 94, which in turn is directly connected to outer zone 144 of bidirectional transistor 106, so that outer zone 144 will be substantially at the same potential as input terminal 140 of flip-flop 54.

If flip-flops 52, 54 are both placed in the 1 state by the application of reset pulses to reset transistors 84, 88, respectively, the potential of output terminal 133 of buffer circuit 100 and the potential of input terminal 140 of flip-flop 54 will both be within the 0 voltage range. The two outer zones 138, 144 of bidirectional transistor 106 will be connected to points within the 0 voltage range. Thus when a negative shift pulse of proper amplitude and duration is applied to shift terminal 146 from a source which is not illustrated and to base region 148 of bidirectional transistor 106, which is connected to shift terminal 146, no transistor action takes place; and there is no change in voltage of input terminal 140 of flip-flop 54. This is, of course, the desired result since both flip-flops 52 and 54 were in the same stable state prior to the application of the shift pulse to terminal 146. The operation of gate 94 when flip-flops 52, 54 are in the 1 state is described by line 1 of Fig. 7, and it is similar to the operation of the circuit of Fig. 6 with transistor 68 taking the place of switch $S_1$ and transistor 112 taking the place of switch $S_2$ of Fig. 6.

If flip-flop 52 is placed in the 1 state and flip-flop 54 is placed in 0 state, the voltage of input terminal 136 of gate 94 will be within the 0 voltage range, and the voltage of output terminal 142 of gate 94 will be within the 1 voltage range. The application of a shift pulse to terminal 146 will cause bidirectional transistor 106 to conduct in such a manner as to raise the potential of input terminal 140 of flip-flop 54 so that it is within the 0 voltage range, which will cause flip-flop 54 to change from its 0 to its 1 state, the state of flip-flop 52 immediately prior to the application of the shift pulse. The operation of gate 94 under these circumstances is described by line 2 of Fig. 7.

If flip-flop 52 is placed in the 0 state and flip-flop 54 is placed in the 1 state, then the potential of input terminal 136 of gate 94 will be within the 1 voltage range and the potential of output terminal 142 of gate 94 will be within the 0 voltage range. The application of a shift pulse to terminal 146 will cause bidirectional transistor 106 to conduct in such a direction that current flowing through base resistor 72 of flip-flop 54 will cause the potential of input terminal 140 to be within the 1 voltage range, which causes flip-flop 54 to change from its 1 to its 0 state, the stable state that flip-flop 52 had immediately prior to the application of the shift pulse. The operation of gate 94 under these circumstances is described by line 3 of Fig. 7.

If flip-flops 52, 54 are both placed in the 0 state, then the potential of input terminal 136 and output terminal 142 of gate 94 will be within the 1 voltage range. The application of a shift pulse to terminal 146 will produce substantially no change in the potential of input terminal 140 of flip-flop 54. This is, of course, satisfactory since flip-flops 52, 54 were in the same stable state immediately prior to the application of the shift pulse. The operation of gate 94 under these circumstances is described by line 4 of Fig. 7. The state of flip-flop 52, for example, can be determined by the potentials of its output terminals 118, 120, or by the potential of output terminal 133 of buffer circuit 100.

Each of buffer circuits 100, 102, 104 is provided with a capacitor connected between the base of its respective transistor and ground, with capacitor 150 being in circuit 100, capacitor 152 being in circuit 102, and capacitor 154 being in circuit 104. The RC network, which consists of base resistor 132 and capacitor 150, delays the change in potential of the base of transistor 112 for a fixed period of time after the potential of terminal 118 of flip-flop 52 has changed as the result of flip-flop 52 changing state. The width of each shift pulse applied to shift terminal 146 is made equal to or less than this period of delay so that a change in state of flip-flop resulting from the application of an input signal to its input terminal 124 by means which are not illustrated during the period the shift pulse is applied to shift terminal 146 will not cause gate 94 to produce a signal which will cause transferee flip-flop 54 to assume a stable state other than the stable state of transferor flip-flop 52 immediately prior to the time the shift pulse is applied to shift terminal 146. In order to obtain a higher speed of operation, advantage may be taken of the carrier-storage delay of the transistors of the flip-flops and the buffer circuit to provide the necessary delay. If this is done, the capacitors between the base of the buffer transistor and ground may be omitted.

The transistors used in the circuit illustrated in Fig. 1 are SB–100's. In such transistors the area of what is defined by the manufacturer as the emitter junction is substantially less than the area of the collector junction. The reason for the difference between the junction areas is to increase $\beta$, the current-gain characteristic of a transistor. Because of the dissimilar junction areas, the operating characteristis of such transistors are not symmetrical; however, this does not present a serious problem when a transistor having asymmetrical characteristics is used for a bidirectional transistor, since they are operated either saturated, or cut off, or condutcing in the emitter-follower mode where the current-gain is not critical. When a transistor having asymmetrical characteristics is used for the bidirectional transistor, it is preferable to connect the outer zone having the larger junction area with the intermediate zone, normally the collector, to the input terminal of the transferor flip-flop. This connection is preferable because the reduced gain of the bidirectional transistor, when operating in the emitter-follower mode, as compared with its greater gain when operating in the common emitter mode, has not significant effect because of the highly degenerative characteristic of an emitter follower.

Fig. 3 is a chart describing the permutations of the states of flip-flops 52, 54 and certain selected states of flip-flop 56. If flip-flops 52, 54, 56 are placed in the states indicated in the four lines of Fig. 3, then upon the application of a shift pulse to terminal 146, flip-flops 52, 54, 56 will assume the states indicated in the corresponding line of Fig. 4. The states of flip-flop 56 in Fig. 3 were chosen so that flip-flop 56 will change state each time a shift pulse is applied to shift terminal 146. It should be noted that flip-flop 52 does not change state when a shift pulse is applied to register 50 since no means are illustrated to supply signals to its input terminal 124.

If flip-flops 52, 54, 56 are placed in the 0, 0, 1 states, respectively, by the application of negative pulses to set transistors 82, 86 and to reset transistor 92, then the potential of input terminal 136 of gate 94 will be within the 1 voltage range and the potential of its output terminal 142 will also be within the 1 voltage range. Thus when a shift pulse is applied to terminal 144, there will be no change in potential of input terminal 140 and no change in state of flip-flop 54. Input terminal 156 of gate 96 will be within the 1 voltage range and its output terminal 158 will be within the 0 voltage range. Therefore, when a shift pulse is applied to terminal 146, bidirectional transistor 108 will conduct, causing input terminal 160 of flip-flop 56 to be within the 1 voltage range, which causes flip-flop 56 to change to the 0 state. When the shift pulse terminates, flip-flops 52, 54, 56 will have the states described by line 1 of Fig. 4. The RC networks in buffer circuits 100, 102, 104 delay any change in the voltage of input terminals 136, 156, 162 of gates 94, 96, 98 for a period of time determined by the time constant of the RC network. Since the width of each shift pulse is made equal to or less than the period of delay provided, this prevents the transferee flip-flop from being placed in a stable state other than the stable state of its transferor flip-flop prior to the application of each shift pulse.

If flip-flops 52, 54, 56 are placed in the 0, 1, 0 states, respectively, input terminal 136 of gate 94 will be in the 1 voltage range and output terminal 143 will be in the 0 voltage range, input terminal 156 of gate 96 will be in the 0 voltage range, and output terminal 158 will be in the 1 voltage range. Thus when a shift pulse is applied to shift terminal 144, gate 94 will cause the potential of input terminal 140 of flip-flop 54 to be within the 1 voltage range, which causes flip-flop 54 to change to the 0 state, and gate 96 will cause the potential of input terminal 160 of flip-flop 56 to be within the 0 voltage range, which causes flip-flop 56 to change to the 1 state. When the shift pulse terminates, flip-flops 52, 54, 56 will have the states described by line 2 of Fig. 4.

If flip-flops 52, 54, 56 are placed in the 1, 0, 1, states, respectively, as described by line 3 of Fig. 3, input terminal 136 of gate 94 will be within the 0 voltage range and output terminal 142 will be within the 1 voltage range. Input terminal 156 of gate 96 will be within the 1 voltage range and output terminal 158 will be within the 0 voltage range. When a shift pulse is applied to terminal 146, gate 94 will produce a positive output signal or will cause the potential of input terminal 140 of flip-flop 54 to be within the 0 voltage range, which causes flip-flop 54 to change to the 1 state. Gate 96 will produce a negative going output signal which will cause flip-flop 56 to change to the 0 state. When the shift pulse terminates, flip-flops 52, 54, 56 will have the states described by line 3 of Fig. 4.

If flip-flops 52, 54, 56 are placed in the 1, 1, 0 states, respectively, as described in line 4 of Fig. 3, input terminal 136 of gate 94 will be within the 0 voltage range, and output terminal 142 will be within the 0 voltage range; input terminal 156 of gate 96 will be within the 0 voltage range, and output terminal 158 will be within the 1 voltage range. When a shift pulse is applied to terminal 146, gate 94 will produce no output signal, but gate 96 will produce a positive going output signal which will cause flip-flop 56 to change to the 1 state. When the shift pulse terminates, flip-flops 52, 54, 56 will have the states described by line 4 of Fig. 4. Output terminal 164 of gate 98 may be connected to the input terminal of the next flip-flop to cause it to assume the state of flip-flop 56 immediately prior to the application of a shift pulse to shift terminal 146 if the next flip-flop is not already in the same state as flip-flop 56.

Fig. 2 is a block diagram of a shift register of *n* stages, where *n* is an integer greater than 1. In Fig. 2 reference numerals used correspond with those which identify similar elements of register 50 as illustrated in Fig. 1. From the foregoing description of the operation of a portion of the shift register illustrated in Fig. 1, it is believed obvious that the number of stages which may be used in a given register is a matter of choice. If it is desired to provide for end-around carry of the information stored in the register, the output terminal of the bidirectional gate of the *n*th flip-flop may be connected to the input terminal of the first flip-flop; i.e., terminal 124 of flipflop 52.

Fig. 5 is a block diagram of a portion of register 170 which has provisions for shifting the binary data represented by the stable states of flip-flops to the left, to the right, and for parallel read in of the binary data to flip-flops of register 142; flip-flops 174, 176, 178, 180, and 182 of register 172 are illustrated. The circuits necessary to transfer the stable states of flip-flops 176, 178, 180 to the left, to the right, and to flip-flops 184, 186, 188 of register 172 are illustrated. Flip-flop 174 is provided to illustrate how the state of flip-flop 176 may be shifted to the left one place, and flip-flop 182 is provided to illustrate how the state of flip-flop 180 may be shifted one place to the right.

Buffer circuit 190 is connected between output terminal 191 of flip-flop 176 and the input terminals of gates 192, 194, and 196; buffer circuit 198 is connected between output terminal 199 of flip-flop 178 and the input terminals of gates 200, 202, and 204, which are associated with flip-flop 178; and buffer circuit 206 is connected between output terminal 207 of flip-flop 180 and the input terminals of gates 208, 210, 212, which are associated with flip-flop 180.

No provisions are illustrated for placing flip-flops 174 through 188 in one or the other of their stable states, but such means as are used with flip-flop 52 in Fig. 1 may be used. When a shift pulse is applied to shift-right terminal 214, it is applied simultaneously to bidirectional gates 192, 200, 208, which will cause flip-flops 178, 180, 182 to assume the stable states flip-flops 176, 178, 180 were in immediately prior to the application of the pulse to terminal 114. When a shift pulse is applied to shift-left terminal 216, it is applied to bidirectional gates 194, 202, 210, which will cause flip-flops 174, 176, 178 to assume the stable states flip-flops 176, 178, 180 were in immediately prior to the application of a pulse to terminal 216. When a shift pulse is applied to parallel read-in terminal 218, it is applied to gates 196, 204, 212, which will cause flip-flops 184, 186, 188 of register 172 to assume the stable states as those flip-flops 176, 178, 180 were in immediately prior to the application of the pulse.

In some systems in which shift registers are incorporated, it is desirable to produce an output signal or pulse each time a transferee flip-flop changes state in response to the application of a shift pulse to the gate. Such a signal can be produced by connecting the primary coil of a pulse transformer between the output terminal of each gate and the input terminal of the flip-flop. The voltage induced in the secondary winding can then be used in whatever manner is desired.

The current-gain characteristics of the bidirectional transistors reduce the power that the source of the shift pulses must produce. This, of course, reduces the amount and volume of equipment and the power consumed by any overall system in which a register such as that described and claimed herein is used. The current-gain characteristics of the transistor and buffer circuit permit a plurality of directional gates to be treed off of it, such as gates 192, 194, 196 are treed off of buffer circuit 190. Thus there is a saving in the number of components required to provide a register which is adapted to shift binary data to the left or to the right or to cause one or more registers such as register 172 to assume the same states as that of the principal register, 170 in this example. The state of each flip-flop can also be determined by the potential of the output terminal of the buffer circuit associated with it; as a result each flip-flop has substantially no load, and it may be operated at higher speeds and with greater reliability than when loaded. From the foregoing, it is believed obvious, the manner in which the bidirectional gates may be interconnected to form a register of any desired number of stages.

In the example of the embodiments of the invention illustrated in Figs. 1 and 2, all the transistors have been illustrated and described as being pnp transistors. As is well known in the art, npn transistors may be substituted for pnp transistors provided the polarity of the supply voltages and the polarity of the triggering signals are reversed.

The values and/or types of components and the voltages appearing in Fig. 1 of the drawings are included, by way of example only, as being suitable for the devices illustrated. Flips-flops 52, 54, buffer circuits 100, 102, and gates 94, 96 have component values substantially the same as those indicated for flip-flop 56, buffer circuit 100, and gate 98. It is to be understood that circuit specifications in accordance with the invention may vary with the design for any particular application.

Obviously, many modifications and variations of the present invention are possible in the light of the above teachings. It is, therefore, to be understood that within the scope of the appended claims, the invention may be practiced other than as specifically described and illustrated.

What is claimed is:

1. In combination: a first and a second bistable device; each of said devices having two stable states, an input terminal, and an output terminal; each of said devices assuming one of its stable states when the voltage of its input terminal is within one predetermined voltage range and assuming the other of its two stable states when the voltage of its input terminal is within a second predetermined voltage range; a bidirectional gate having an input terminal and an output terminal; buffer means interconnecting the output terminal of the first device and the input terminal of said gate; circuit means interconnecting the output terminal of the gate and the input terminal of the second bistable device; circuit means for applying shift pulses to said gate; said gate, when a shift pulse is applied to it and if the states of the two devices do not correspond, causing the voltage of the input terminal of the second device to be within that predetermined voltage range which causes the second device to have a stable state corresponding to the stable state of the first device prior to the time each shift pulse is applied to said gate.

2. In combination: a first and a second bistable device; each of said devices having two stable states, a 0 state and a 1 state, an input terminal, and an output terminal; each of said devices assuming its 0 state when the voltage of its input terminal is within a voltage range denoted 1 and assuming its 1 state when the voltage of its input terminal is within a voltage range denoted 0; a bidirectional gate having an input terminal and an output terminal; a buffer and delay circuit interconnecting the output terminal of the first bistable device and the input terminal of said gate; circuit means directly connecting the output terminal of the gate to the input terminal of the second device; circuit means for applying shift pulses to said gate; said gate, in response to each shift pulse applied to it, causing the voltage of the input terminal of the second device to be within the voltage range which will cause the second bistable device to have the same stable state that the first device had prior to the application of each of said shift pulses to said gate.

3. In combination: a first and a second bistable device; each of said devices having two stable states, an input terminal, and an output terminal; each of said devices being in a stable state corresponding to whichever of two separate voltage ranges its input terminal is within; each of said devices being so constructed and arranged that when the voltage of its input terminal is within one voltage range, the voltage of its output terminal is within the other range; a bidirectional gate having an output terminal and an input terminal and adapted to have shift pulses applied thereto; buffer, delay, and inverting means connecting the output terminal of the first device to the input terminal of the gate; circuit means connecting the output terminal of the gate to the input terminal of the second device; and circuit means for placing the first and second bistable devices in one or the other of their two stable states; said gating means, responsive to each shift pulse applied thereto, causing the input terminal of the second device to be within the same voltage range that the input terminal of the first device was within prior to the time each shift pulse is applied to said gate.

4. In combination: a first and a second bistable device; each of said devices comprising a first and a second cross-coupled junction transistor; a buffer circuit comprising a junction transistor; means coupling the base of said junction transistor of the buffer circuit to the collector of the first transistor of the first bistable device; a bidirectional gate comprising a bidirectional transistor; circuit means connecting one outer zone of the bidirectional transistor to the collector of the transistor of the buffer circuit; circuit means connecting the other outer zone of the bidirectional transistor to the base of the first transistor of the second bistable device; a shift terminal adapted to have shift pulses applied thereto; and circuit means connecting the shift terminal to the base of the bidirectional transistor.

5. In combination: a first and a second bistable device; each of said devices comprising a first and a second cross-coupled junction transistor; a common-emitter amplifying circuit including a junction transistor; a base resistor connecting the base of the junction transistor of the amplifying circuit to the collector of the first transistor of the first bistable device; a capacitor conected between the base and emitter of the transistor of the amplifying circuit; a bidirectional gate comprising a bidirectional transistor; circuit means connecting one outer zone of the bidirectional transistor to the collector of the amplifying circuit; circuit means connecting the other outer zone of the bidirectional transistor to the base of the first transistor of the second bistable device; a shift terminal adapted to have shift pulses applied thereto; and circuit means connecting the shift terminal to the base of the bidirectional transistor.

6. In combination: a first and a second flip-flop; each of said flip-flops comprising a first and a second transistor; a first base resistor connecting the collector of the first transistor to the base of the second transistor, and a second base resistor connecting the collector of the second transistor to the base of the first transistor of each of said flip-flops; a buffer circuit comprising a third transistor in the common emitter configuration; a capacitor connected between the base and emitter of the third transistor; circuit means connecting the base of the third transistor to the collecor of the first transistor of the first flip-flop; a bidirectional transistor having an intermediate zone and two outer zones; circuit means connecting one outer zone of the bidirectional transistor to the collector of the third transistor; circuit means connecting the other outer zone of the bidirectional transistor to the base of the first transistor of the second flip-flop; a shift terminal adapted to have shift pulses applied thereto; and circuit means connecting said shift terminal to the base of the bidirectional transistor.

7. In combination: a first and a second flip-flop; each of said flip-flops comprising a first and a second transistor; a first base resistor connecting the collector of the first transistor to the base of the second transistor; a second base resistor connecting the collector of the second transistor to the base of the first transistor; a first load resistor connecting the collector of the first transistor to a source of collector potential and a second load resistor connecting the collector of the second transistor to a source of collector potential; a third transistor; a third base resistor connecting the base of the third transistor to the collector of the first transistof of the first flip-flop; a capacitor connected between the base of the third transistor and a point at reference potential; a load resistor connected between the collector of the third transistor and a source of collector potential; a bidirectional transistor having an intermediate zone and two outer zones; circuit means connecting one outer zone of the bidirectional transistor to the collector of the third transistor; means directly connecting the other outer zone of the bidirectional transistor to the base of the first transistor of the second flip-flop; a shift terminal adapted to have shift pulses applied thereto; and circuit means connecting said shift terminal to the base of the bidirectional transistor; the width of each shift pulse being no greater than the time constant of the circuit comprised of the third base resistor and said capacitor.

8. In combination: a first, a second, a third, and a fourth flip-flop; each of said flip-flops having an output terminal and an input terminal; each of said circuits being so designed that when the voltage of its input terminal is within one voltage range, the flip-flop is in one of its stable states and when the voltage of its input terminal is within a second voltage range, the flip-flop is in the other of its stable stages; a first, a second, and a third bidirectional gate; each of said gates having an input terminal and an output terminal; a buffer circuit having an input terminal and an output terminal; circuit means connecting the input terminals of said gates to the output terminal of the buffer circuit; circuit means connecting the input terminal of the buffer circuit to the output terminal of the first flip-flop; circuit means connecting the output terminal of the first gate to the input terminal of the second flip-flop; circuit means connecting the output terminal of the second gate to the input terminal of the third flip-flop; circuit means connecting the output terminal of the third gate to the input terminal of the fourth flip-flop; and circuit means for applying shift pulses to each of said gates; each of said gates adapted to cause the voltage of the input terminal connected to its output terminal to be within the voltage range the input terminal of the first flip-flop was within when each shift pulse is applied to the gate.

9. In combination: $n$ bistable devices, where $n$ is an integer greater than 1; each of said devices having two stable states, an input terminal, and an output terminal; each of said devices assuming one of its stable states when the voltage of its input terminal is within one predetermined voltage range and assuming its other stable state when the voltage of its input terminal is within a second predetermined voltage range; $n$ bidirectional gates; each of said gates having an input terminal and an output terminal; each of said gates being associated with a different one of said devices; $n$ buffer circuits; each of said buffer circuits being connected between the output terminal of a bistable device and the input terminal of the gate associated with said device; circuit means connecting the output terminal of each gate to an input terminal of a different one of said bistable devices; circuit means for applying shift pulses to each of said gates; and circuit means for placing each of said bistable devices in one or the other of its two stable states; each of said gates being so constructed and arranged that when each shift pulse is applied to it, each gate causes the voltage of the input terminal of the device connected to its output terminal to be within that predetermined voltage range which will cause the bistable device connected to its output terminal to have the same stable state that the bistable device associated with said gate had prior to the time each shift pulse is applied to said gates.

10. In combination: $n$ bistable devices, where $n$ is an integer greater than 1; each of said devices comprising a first and a second cross-coupled junction transistor;

n bidirectional gates comprising a bidirectional transistor having a base and two outer zones; each of said bidirectional gates being associated with one of said bistable devices; n buffer circuits; each of said buffer circuits including a junction transistor; circuit means connecting the base of the transistor of each buffer circuit to the collector of the first transistor of a different one of said bistable devices; circuit means connecting one outer zone of each bidirectional transistor to the collector of the transistor of the buffer circuit connecting each gate to its associated bistable device; circuit means connecting the other outer zone of each bidirectional transistor to the base of the first transistor of a bistable device with which each gate is not associated; a shift terminal adapted to have shift pulses applied thereto; and circuit means connecting the shift terminal to the bases of each of the bidirectional transistors of said gates.

11. A shift register comprising n flip-flops, where n is an integer greater than 1; each of said flip-flops having an input terminal, an output terminal, and two stable states; n buffer circuits; each buffer circuit having an input terminal and an output terminal; the input terminal of each buffer circuit being connected to the output terminal of a different one of said flip-flops; n shift-left bidirectional gates; n shift-right bidirectional gates; and n parallel read-in gates; each of said gates having an input terminal and an output terminal; the input terminal of a shift-left gate, a shift-right gate, and a parallel read-in gate being connected to the output terminal of a different one of said buffer circuits, whereby a shift-right, a shift-left, and a parallel read-in gate is associated with each flip-flop of the register; the output terminal of each shift-right gate being connected to the input terminal of the flip-flop to the right of the flip-flop with which that gate is associated; the output terminal of the shift-left gate being connected to the input terminal of the flip-flop to the left of the flip-flop with which that gate is associated; the output terminal of the parallel read-in gate adapted to be connected to the input terminal of a flip-flop in another register; a shift-right terminal adapted to have control pulses applied to it; a shift-left terminal adapted to have control pulses applied to it; a parallel read-in terminal adapted to have control pulses applied to it; circuit means connecting each of the shift-right gates to the shift-right terminal; circuit means connecting each of the shift-left gates to the shift-left terminal; and circuit means connecting the parallel read-in gates to the parallel read-in terminal; each of said gates causing the flip-flop to which its output terminal is connected to assume the stable state of the flip-flop with which said gate is associated each time a control pulse is applied to said gate.

12. In combination: a first and a second bistable device; each of said devices having two stable states, an input terminal and an output terminal; each of said devices assuming one of its stable states when the voltage of its input terminal is in one predetermined voltage range and assuming its other stable state when the voltage of its input terminal is within a second predetermined voltage range; a gate comprising a bidirectional transistor, and having an output terminal, and an input terminal; said gate adapted to have shift pulses applied thereto; circuit means interconnecting the input terminal of the bidirectional gate to the output terminal of said first bistable device; and circuit means connecting the output terminal of said gate to the input terminal of said second device; said gate, responsive to each shift pulse, causing the input terminal of the second device to be within a voltage range which will cause the second device to have a stable state corresponding to the stable state of the first device prior to the application of each of said shift pulses to said bidirectional gate.

13. In combination: a first and a second bistable device; each of said devices having two stable states, an input terminal and an output terminal; each of said devices assuming one of its stable states when the voltage of its input terminal is within one predetermined voltage range and assuming the other of its stable states when the voltage of its input terminal is within a second predetermined voltage range; a bidirectional transistor having an intermediate zone and two outer zones; first circuit means connecting one outer zone of the bidirectional transistor to the output terminal of said first bistable device; second circuit means connecting the other outer zone of said bidirectional transistor to the input terminal of said second bistable device; circuit adapted to apply shift pulses to the intermediate zone of said bidirectional transistor; said bidirectional transistor, responsive to each shift pulse, causing the input terminal of the second device to be within that voltage range which will cause the second device to have a stable state corresponding to the stable state of the first device prior to the application of each of said shift pulses to said bidirectional transistor.

14. In the combination as defined in claim 13 in which said first circuit means includes delay means.

References Cited in the file of this patent

UNITED STATES PATENTS

| | | |
|---|---|---|
| 2,384,379 | Ingram | Sept. 4, 1945 |
| 2,706,811 | Steele | Apr. 19, 1955 |
| 2,764,343 | Diener | Sept. 25, 1956 |
| 2,785,304 | Bruce et al. | Mar. 12, 1957 |

UNITED STATES PATENT OFFICE
CERTIFICATE OF CORRECTION

October 6, 1959

ıtent No. 2,907,898

Edward Gary Clark

It is hereby certified that error appears in the printed specification ' the above numbered patent requiring correction and that the said Letters ıtent should read as corrected below.

Column 9, line 65, for "directional" read -- bidirectional --; column 4, line 33, after "circuit" insert -- means --.

Signed and sealed this 12th day of April 1960.

(SEAL)
ttest:

KARL H. AXLINE
.ttesting Officer

ROBERT C. WATSON
Commissioner of Patents